United States Patent
Zuigyou

(10) Patent No.: US 7,469,734 B2
(45) Date of Patent: Dec. 30, 2008

(54) RUBBER-FIBER COMPOSITE MATERIAL AND RUBBER ARTICLE USING THE SAME

(75) Inventor: Yugo Zuigyou, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 134 days.

(21) Appl. No.: 11/505,892

(22) Filed: Aug. 18, 2006

(65) Prior Publication Data
US 2006/0283533 A1 Dec. 21, 2006

Related U.S. Application Data

(62) Division of application No. 10/478,672, filed as application No. PCT/JP02/05073 on May 24, 2002, now abandoned.

(30) Foreign Application Priority Data

May 24, 2001 (JP) ............................. 2001-154892
Oct. 5, 2001 (JP) ............................. 2001-310462

(51) Int. Cl.
*B60C 5/00* (2006.01)
*B60C 5/02* (2006.01)
*B60C 5/08* (2006.01)

(52) U.S. Cl. ..................... 152/510; 152/511; 152/512

(58) Field of Classification Search ................ 152/510, 152/511, 512
See application file for complete search history.

(56) References Cited

U.S. PATENT DOCUMENTS

| 3,724,521 A | 4/1973 | Coddington et al. |
| 4,008,743 A | 2/1977 | Welch |
| 6,209,604 B1 | 4/2001 | Nishikawa et al. |

FOREIGN PATENT DOCUMENTS

| EP | 0924109 A2 | 6/1999 |
| EP | 1190846 A2 | 3/2002 |

OTHER PUBLICATIONS

Supplemental European Search Report dated Aug. 16, 2004.

*Primary Examiner*—Justin Fischer
(74) *Attorney, Agent, or Firm*—Sughrue Mion, PLLC

(57) ABSTRACT

A rubber-fiber composite material of the present invention comprises a non-woven fabric and a rubber which coats the non-woven fabric. At least a part of the non-woven fabric is made of an organic fiber having a single fiber diameter of 10 to 35 μm, a fiber length of 30 to 100 mm and a tensile modulus of 50 GPa or higher. By the use of the non-woven fabric at least a part of which is made of the organic fiber having the above properties, a sufficient impregnation of rubber into the inside of the non-woven fabric is ensured to enable the production of the rubber-fiber composite material having a high stiffness. Using the rubber-fiber composite material of the present invention as the reinforcing material for rubber articles, the resultant rubber articles have enhanced stiffness, improved durability and reduced weight.

11 Claims, 1 Drawing Sheet

RUBBER-FIBER COMPOSITE MATERIAL AND RUBBER ARTICLE USING THE SAME

CROSS-REFERENCE TO RELATED APPLICATIONS

This is a divisional of application Ser. No. 10/478,672, filed on Nov. 24, 2003, now abandoned which is a § 371 National Stage Application of PCT/JP02/05073, filed May 24, 2002, the entire disclosures of both of which are incorporated herein by reference.

TECHNICAL FIELD

The present invention relates to a rubber-fiber composite material and a rubber article comprising the rubber-fiber composite material, and more particularly to a rubber-fiber composite material that is capable, when used as a reinforcing material for rubber articles such as tires and belts, of enhancing the durability and reducing the weight thereof, and to a rubber article, especially a tire, produced by using the rubber-fiber composite material.

BACKGROUND ART

Hitherto, as reinforcing materials for use in rubber composite materials for tires, there are known organic fiber cords and steel cords. In recent years, rubber composite materials comprising non-woven fabric have been proposed. For example, Japanese Patent Application Laid-Open No. 10-53010 proposes to dispose a rubber composite material comprising non-woven fabric between a carcass ply and a sidewall portion of a tire to increase the stiffness of sidewall portion and improve an operating stability of the tire without sacrificing its inherent properties such as comfortable ride and durability and without needing complicated production process.

Non-woven fabric has been noticed because of its good reinforcing capability, and the application of the non-woven fabric to rubber articles other than tire which are required to be stiff and durable has been recently studied. In conventional rubber composite materials containing no reinforcing material, it is also expected that the design freedom can be extended and a high durability can be achieved by using the non-woven fabric reinforcing material.

To exhibit excellent properties such as stiffness and elongation by using non-woven fabrics as the reinforcing materials for rubber composite materials, a sufficient impregnation of rubber into the inside of non-woven fabrics.

To remarkably improve durability by enhancing the stiffness of reinforced rubber articles, it is also known to increase the basis weight of non-woven fabrics. However, when the basis weight exceeds a certain level, the impregnation of rubber into the inside of non-woven fabric becomes lowered, resulting in failure to provide composite materials exhibiting a sufficient stiffness.

Conventionally, there have been studied and developed various runflat tires and safety tires that are capable of continuously running in uninflated conditions over a considerable distance until reaching facilities for repair and mend even when the pneumatic tires are punctured. For example, there are known a runflat tire having an improved tube such as reinforced tube, multi-chamber tube, filled tube and folded tube, a sealant-coated tire, a sealant-filled tire, a core built-in type tire, etc. Recently, Japanese Patent Application Laid-Open No. 7-276931 discloses a doubly structured safety tire comprising an external tire and an internal tire slightly smaller than the external tire which is disposed inside the external tire.

However, these conventional tires are difficult to produce because a specific production process and auxiliary members made of specific materials are required. In addition, the tires are difficult to be fit to wheel rim and be handled. For example, the tube-improved runflat tire having a multi-chamber tube is impractical because of difficulty in producing the tube. The sealant-coated tire or a sealant-filled tire have difficulty in developing filling methods of sealant and sealant materials. The core built-in type tire is difficult to fit its core to rim. The safety tires of mousse type such as sponge-filled tires and elastomer-filled tires are difficult to produce, and the shape thereof is difficult to control and stabilize. The safety tire disclosed in Japanese Patent Application Laid-Open No. 7-276931 are heavy in weight because of its double structure, resulting in deteriorated fuel consumption.

DISCLOSURE OF INVENTION

An object of the present invention is to solve the above problems and provide a reinforcing material exhibiting a high stiffness while ensuring sufficient impregnation of rubber into the inside of non-woven fabric, more specifically, to provide a rubber-fiber composite material capable, when used as a reinforcing material for rubber articles such as tires and belts, of improving the durability by enhancing the stiffness thereof and reducing the weight thereof, and a rubber article using the rubber-fiber-composite material.

Another object of the present invention is to provide a pneumatic safety tire to which the rubber-fiber composite material is applied, having advantages that (1) the production thereof is easy because of its simple structure, (2) the fitting to rim is easy and economical materials can be used, (3) the low fuel consumption is not impaired, and (4) the durability under normal running condition and the run-flat durability are excellent.

In view of solving the above problems, the inventors have made extensive study on the relationship between the single fiber diameter and stiffness of filaments constituting non-woven fabric, the impregnation of rubber into the non-woven fabric, and the stiffness. As a result thereof, the inventors have found that when the single fiber diameter and the elastic modulus of filaments constituting the non-woven fabric are increased, the basis weight becomes considerably increased and the impregnation of rubber into the inside of the non-woven fabric is not lowered, thereby capable of producing a rubber-fiber composite material exhibiting a high stiffness.

As a result of study on conventional run-flat tires of tube built-in type, the inventors have further found that the outer diameter of tube increases by creep deformation due to centrifugal force which is generated during normal running, and that the tube thereby comes into contact with an inner liner of tire to cause damage of the tube, thereby failing to ensure a high run-flat running performance. In addition, it has been found that even though the inner pressure of tube is made higher than that of the tire in order to suppress the deflection during run-flat running, a sufficient space cannot be ensured between the tube and the tire, and therefore, the tube still remains easy to receive damage. As a result of above studies, the inventors have found that it is effective for ensuring a sufficient space between the tube and the tire to dispose a specific reinforcing layer made of non-woven fabric and rubber at least on a top portion of the tube. The present invention has been accomplished on the basis of these findings.

Thus, the present invention provides a rubber-fiber composite material comprising a non-woven fabric and a rubber which coats the non-woven fabric, at least a part of the non-woven fabric being made of an organic fiber having a single fiber diameter of 10 to 35 μm, a fiber length of 30 to 100 mm, and a tensile modulus of 50 GPa or higher.

The present invention also provides a rubber article, especially a tire, which is reinforced by the rubber-fiber composite material. The rubber-fiber composite material of the present invention reinforces rubber articles to increase the stiffness thereof without deteriorating the durability of the rubber articles. In particular, a radial tire having its sidewall portion reinforced by the rubber-fiber composite material is effectively enhanced in the stiffness at the sidewall portion, resulting in improved operation stability of tire.

Further, the present invention provides a safety pneumatic tire comprising a tire assembly having (A) a tubeless tire comprising an annular tread having a pair of sidewalls respectively extending radially inwardly from opposite ends of the tread, and beads each embedded in a radially inner end of the sidewall; (B) a tube disposed within the tubeless tire; and (C) a reinforcing layer covering at least a top portion of the tube, wherein a space is formed between an outer surface of the tube and an inner surface of a crown portion of the tubeless tire in inflated conditions; wherein the reinforcing layer is disposed so as to extend radially outwardly to come into close contact with an inner surface of the tread of the tubeless tire when an inner pressure of the tire decreases, thereby enabling run-flat running; and wherein the reinforcing layer is made of a rubber-fiber composite material comprising a non-woven fabric and a rubber, at least a part of the non-woven fabric being made of an organic fiber having a single fiber diameter of 10 to 35 μm and a tensile modulus of 50 GPa or higher.

BEST MODE FOR CARRYING OUT THE INVENTION

Figure 1:
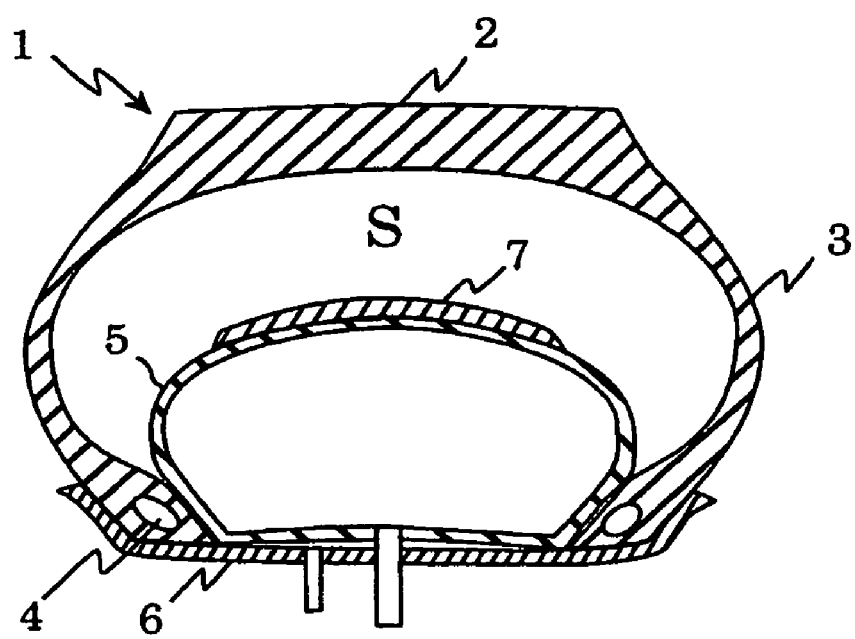
FIG. 1 is a schematic cross-sectional view showing one embodiment of a safety pneumatic tire according to the present invention.

The non-woven fabrics used in the present invention are not particularly limited, and those produced by any methods are usable. For example, non-woven fabrics produced by web-making methods such as carding, paper-making, air-laying, and melt-blowing/spun-bonding may be used. The web fiber-bonding methods other than the melt-blowing method and the spun-bonding method may include methods by heat fusion or binder and methods for entangling fibers by water jet or needle such as a water-jet entanglement and a needle punching method. Preferred are non-woven fabrics which are produced by the water-jet entanglement and the needle punching method, in which fibers are entangled by water jet or needle, and the melt-blowing/spun-bonding method.

In the rubber-fiber composite material of the present invention, it is important for the non-woven fabric to have a structure which allows rubber to sufficiently impregnate between the filament fibers (organic fibers), and a structure which allows the filaments and the rubber to mutually form continuous layers over a relatively large distance and broad range.

To meet the above requirements, the diameter or major diameter of single filament fibers is needed to be 10 to 35 μm and more preferably 20 to 30 μm. If less than 10 μm, the space between the filament fibers is not sufficient to make the impregnation of rubber into the inside of the non-woven fabric difficult. Therefore, the resultant rubber-fiber composite material fails to exhibit its intended function sufficiently. If more than 35 μm, the filament fibers acquire an excessively high flexural stiffness, making the production of a non-woven fabric of fibers sufficiently entangled difficult. As a result, the resultant rubber-fiber composite material fails to sufficiently exhibit the intended function. The cross-sectional shape of filament fibers is not particularly limited, and may be circular, non-circular or may be of a hollow shape.

The length of filament fibers (organic fibers) is preferably 30 to 100 mm and more preferably 40 to 60 mm. If less than 30 mm, the filament fiber-to-filament fiber entanglement is insufficient, resulting in the failure of the reinforcing layer made of the resultant rubber-fiber composite material to maintain its stiffness in some cases. If more than 100 mm, since the number of filament fiber ends is too small, the filament fiber-to-filament fiber entanglement is also insufficient, resulting in the failure of the reinforcing layer to maintain its stiffness in some cases.

The non-woven fabric used in the present invention contains the organic fibers having a tensile modulus of 50 GPa or higher at least partly and preferably in an amount of 50% by weight or more. If a non-woven fabric contains organic fibers having a tensile modulus of less than 50 GPa in an excessively large amount or a non-woven fabric contains organic fibers having a tensile modulus of 50 GPa or higher in an excessively small amount, the basis weight should be increased to obtain a rubber-fiber composite material having a high stiffness. However, the increasing of the basis weight narrows the space between the filament fibers in the non-woven fabric to make the impregnation of rubber into the inside of the non-woven fabric difficult, resulting in the failure of resultant rubber-fiber composite material to sufficiently exhibit its intended function in some cases.

The basis weight of the non-woven fabric is preferably 30 to 120 g/m$^2$ and more preferably 40 to 80 g/m$^2$. If less than 30 g/m$^2$, the unevenness of non-woven fabric is promoted to likely cause the failure of resultant rubber-fiber composite material to show a uniform stiffness. If more than 120 g/m$^2$, a sufficient space cannot be attained between the filament fibers in the non-woven fabric even if the diameter of the filament fibers is increased. Therefore, the impregnation of rubber into the inside of the non-woven fabric becomes difficult to likely cause the failure of resultant rubber-fiber composite material to sufficiently exhibit its intended function.

It is preferred for the non-woven fabric to have a thickness D1 of 1.2 to 4.0 mm when measured under a pressure of 10 gf/cm$^2$ (about 981 Pa) and a thickness D2 of 0.3 to 1.2 mm when measured under a pressure of 200 gf/cm$^2$ (about 19,613 Pa), with a ratio D1/D2 of 2 or more. If the ratio is less than 2, the impregnation of rubber when formed into a composite material by rolling, etc. may be poor, thereby likely to make the stiffness of the rubber-fiber composite material insufficient.

Examples of the organic fibers (filament fibers) include aramid fibers, polyolefin ketone fibers, polybenzazole fibers, polyimide fibers, polyester fibers, carbon fibers, and polyether ketone fibers, with at least one fiber selected from the group consisting of p-aramid fibers, polyolefin ketone fibers, polybenzazole fibers and polyimide fibers being preferred.

Examples of the p-aramid fibers include copoly-p-phenylene-3,4'-oxydiphenylene terephthalamide fibers and poly-p-phenylene terephthalamide fibers, with copoly-p-phenylene-3,4'-oxydiphenylene terephthalamide being preferred. The p-aramid fibers may be commercially available under the trademark "Technora" from Teijin Limited and under the trademark "Kevlar" from Du Pont Corp.

The polyolefin ketone fiber comprises a copolymer of carbon monoxide and olefins such as ethylene, propylene, butene, pentene, hexene, heptene, octene, nonene, decene, and dodecene.

The polybenzazole fibers are exemplified by poly-p-phenylenebenzobisoxazole fibers and commercially available, for example, under the trademark "Zylon" from Toyobo Co., Ltd. The polyimide fibers are commercially available, for example, under the product name "P84" from Inspecfibers Inc. In addition, examples of the polyester fibers include polyethylene terephthalate fibers and polyethylene naphthalate fibers.

The organic fiber (filament fiber) may contain a certain amount of clay (clay mineral) which is micro-dispersed therein to enhance its elastic modulus and simultaneously reduce its heat shrinkage, thereby further improving the rubber-fiber composite material.

The dispersion of inorganic materials such as clay into the organic fiber, etc. in molecular level is accomplished by the intercalation of clay (i.e., dispersion into a matrix polymer of surface organized clay) for dispersing the clay into the polymer of fibers in micron or nano order.

The rubber component for the rubber-fiber composite material of the present invention is not particularly limited, and preferably natural rubbers, butadiene rubber, styrene-butadiene rubber and isoprene rubber. The 100% modulus of the rubber component may be appropriately controlled according to the applications. For example, when the rubber-fiber composite material is intended to be used in a rubber safety device, the 100% modulus is preferably 1.0 to 5.0 MPa, and when intended to be used as a reinforcing material for the sidewall and tube, the 100% modulus is preferably 0.3 to 0.5 MPa.

To enhance the durability of the rubber-fiber composite material by improving the bonding between the rubber and the organic fiber, the surface of the organic fiber, if desired, may be coated with a film of metal or metal oxide that is reactive with sulfur by physical vapor deposition (PVD) or chemical vapor deposition (CVD), preferably by sputtering.

The non-woven fabric and rubber are relatively easily made into a composite material by using an apparatus which is conventionally used in rubberizing organic fiber cords or steel cords. For example, a sheet or sheets of an unvulcanized rubber composition are pressed to one or both surfaces of the non-woven fabric by a pressing machine or rolls to replace the air inside the non-woven fabric with the rubber. Alternatively, a liquid unvulcanized rubber composition in solvent is applied to the non-woven fabric. Using the unvulcanized composite material thus obtained as the reinforcing layer, a raw tire is prepared and then formed under vulcanization into a tire. The rubber-fiber composite material of the present invention produced in the manner mentioned above preferably has a tensile modulus of 2 to 20 GPa.

Japanese Patent Application Laid-Open No. 10-53010 discloses to dispose a sidewall reinforcing layer made of a rubber/filament fiber composite between a carcass ply and the sidewall of a pneumatic radial tire so as to cover at least 35% or more of a portion extending from an upper end of a bead filler to an peripheral end of a belt portion having a maximum width. The rubber-fiber composite material of the present invention is suitably used as the sidewall reinforcing layer, particularly to remarkably enhance the operation stability and drum durability.

The rubber-fiber composite material of the present invention is also suitably applied to a safety pneumatic tire, which will be explained below in more detail.

In the safety pneumatic tire having a tube inside a tubeless tire according to the present invention, the tube is reinforced by a reinforcing layer which covers at least a top portion of the tube (an upper surface of the tube facing an inner wall of a tread of the outer tire). With this reinforcing layer, as described below, the initial tensile modulus, the breaking strength and elongation at break which are required in assembling tire can be satisfied, and the durability of the tube during normal running and running under reduced inner pressure can be effectively improved.

Namely, during normal running (for example, at a speed of 100 km/h), the reinforcing layer prevents the tube from stretching to come into contact with the radially inner surface of the tire, by resisting the centrifugal force due to tire rolling and a tensile force due to difference between the inner pressures of the tube and the tire (e.g., 50 kPa when the inner pressures is 900 kPa for the tube and 950 kPa for the tire). When the tire is punctuated (e.g., the inner pressure of the tire is reduced to 400 kPa or lower), the reinforcing layer stretches to the radially inner surface of the tire to prevent the tire from being deflected. As long as exhibiting such effects, the stretching of the reinforcing layer may be elastic deformation or plastic deformation.

The reinforcing layer for the tube is made of the rubber-fiber composite material of the present invention as described in detail above.

In the rubber-fiber composite material forming the reinforcing layer for the tube, the diameter or major diameter of the organic single fibers constituting the non-woven fabric is also needed to be 10 to 35 μm.

As described above, the rubber-fiber composite material constituting the reinforcing layer is basically required to prevent the tube from stretching by resisting the centrifugal force due to tire rolling during normal running and the tensile force due to the difference between the inner pressures of the tube and the tire. To exhibit a tensile modulus satisfying this requirement, at least a part of the non-woven fabric should be made of the organic fibers having a tensile modulus of 50 GPa or higher. The content of organic fibers having a tensile modulus of 50 GPa or higher is preferably 50% by weight or higher and more preferably 100% by weight of the non-woven fabric.

If a rubber-fiber composite material comprising a rubber and a non-woven fabric which is mainly made of filament fibers having a tensile modulus of less than 50 GPa is applied to the reinforcing layer for the tube, a sufficient tensile modulus cannot be obtained. To prevent the creep deformation of the tube by such a rubber-fiber composite material, it is required, for example, to make the reinforcing layer into a laminate with a large number of layers. As a result, the weight of the safety tire assembly increases, resulting in remarkable deterioration in normal running performance such as low fuel consumption.

The basis weight of the non-woven fabric for use in the rubber-fiber composite material is preferably 30 to 120 $g/cm^2$, as described above. When less than 30 $g/cm^2$, the stretching of the tube is difficult to be prevented. When exceeding 120 $g/cm^2$, the stretching of the tube under reduced tire pressure may be insufficient. The thickness of the non-woven fabric is preferably 0.2 to 1.4 mm when measured under a pressure of 20 $gf/cm^2$ (about 1,961 Pa). The tensile modulus of the rubber-fiber composite material of the present invention, when intended to be used as the reinforcing layer for the tube, is preferably 2 to 20 GPa. Further, the reinforcing layer is preferably a laminate of 3 to 6 layers composed of the rubber-fiber composite material.

Next, the construction of the safety pneumatic tire according to the present invention is described in detail by referring to the accompanying drawing.

FIG. 1 is a schematic cross-sectional view showing one embodiment of the safety pneumatic tire according to the present invention. A tubeless tire 1 has an annular tread 2, a pair of sidewalls 3 extending radially inwardly from opposite ends of the tread 2, and bead portions 4 formed at a radially inner end of each sidewall 3. The bead portions 4 are mounted to a rim 6, and a tube 5 is disposed within the tubeless tire 1. A reinforcing layer 7 is formed so as to cover at least a top portion of the tube 5.

A large space S is formed between an outer surface of the tube 5 and an inner wall of a crown portion of the tubeless tire 1. In addition, the tube is arranged so as to bring its right and left side portions into close contact with an inner surface of the bead portions 4 of the tubeless tire 1. In inflated conditions, an inner pressure $P_2$ of the tube 5 is kept higher than an inner pressure $P_1$ of the space S, usually by 20 to 100 kPa.

When the tire is deflated by external causes, for example, by riding over nails, the inner pressure $P_1$ of the space S is reduced and the inner pressure $P_2$ of the tube 5 and the inner pressure $P_1$ of the space S are unbalanced to allow the inner pressure of the tube 5 to become relatively larger. As a result, the tube 5 expands to fit the radially inner surface of the tubeless tire 1 to finally maintain the shape of the tire. At the same time, a run-flat running under a tube inner pressure maintained higher than in the case where no reinforcing layer 7 is provided is enabled, because $P_2$ is set higher than $P_1$. Therefore, the deflection of the sidewall portions is prevented to significantly increase the run-flat running distance.

The present invention is described in more detail by reference to the following examples. However, it should be noted that the following examples are only illustrative and not intended to limit the invention thereto.

The performance of tire was measured by the following methods.

(1) Operation Stability

Test tires were mounted to a motor vehicle (domestic car: FF 2,000 cc) and subjected to practical running test by straight run and lane change at a speed of 40 to 120 km/h. The operation stability was evaluated according to the feelings received by the driver, and the evaluation results were classified into the following ranks by comparing with that of Control Example 1:

0: substantially identical
    +2: slightly better
    +4: better
    +8: remarkably better The total of the rank points was expressed by an index number taking that of Control Example 1 as 100.

(2) Drum Durability Under High Load

A test tire was inflated to a maximum air pressure prescribed in JATMA Standard and allowed to stand for 24 h at a laboratory temperature of 25±2° C. Then, the test tire was loaded with two times a maximum load prescribed in JATMA Standard and subjected to a running test on a drum having a diameter of 1.7 m at a speed of 60 km/h to measure a running distance until causing tire collapsing. The results are expressed by index numbers taking the running distance of Control Example 1 as 100.

(3) Measurement of Thickness

A load of 50 or 1,000 gf/5 cm$^2$ was applied onto an upper surface of a non-woven fabric cut into an appropriate size, and the thickness was measured at 10 points using a thickness gauge "Model ID-F125" available from Mitsutoyo Corp. The measured values were averaged.

(4) Laboratory Drum Durability (Normal Running Durability)

A test tire was mounted to a rim (9.00×22.5) at a predetermined inner pressure. The tire was pressed to a drum rotating at a peripheral speed of 60 km/h under a load of 34.81 kN and the running distance until causing tire collapsing was measured. The results are expressed by index numbers taking the result of Control Example 4 as 100. The larger the index number, the more excellent the normal running durability.

(5) Run-Flat Durability

A test tire was mounted to a rim (9.00×22.5) at a predetermined inner pressure. A valve core was removed from the tire to reduce the inner pressure to atmospheric pressure, thereby allowing a tube to expand and come into contact with the inner surface of the tire. Then, the drum running test was performed under the conditions: a load of 34.81 kN, a speed of 60 km/h, and a laboratory temperature of 38° C. The run-flat durability was evaluated by the running distance until causing tire collapsing and expressed by an index number taking the result of Control Example 4 as 100. The larger the index number, the more excellent the run-flat durability.

EXAMPLES 1-5 and COMPARATIVE EXAMPLES 1-3

Non-woven fabrics used in respective Examples and Comparative Examples were prepared by a water jet entanglement method. In Comparative Example 1, the non-woven fabric produced by the water jet entanglement method was pressed under 10 kgf/cm$^2$ at 150° C. for one minute. The kind of fiber, fiber length, single fiber diameter and basis weight of the non-woven fabric are shown in Table 1. Unvulcanized rubber was pressed to both the upper and lower surfaces of the non-woven fabric by rolls to prepare a rubber-fiber composite material, which was used as the reinforcing layer for sidewalls to produce a radial tire having a size of 195/65 R15 by an ordinary method. The radial tire was evaluated for the operation stability and the drum durability by the above methods. The results are shown in Table 1.

CONTROL EXAMPLES 1 and 2

The same procedure as in Example 1 was repeated except that a rubber-coated cord fabric composed of 1,670 dtex two-ply polyethylene terephthalate (PET) yarns was used as the reinforcing layer for sidewalls, thereby producing radial tires having the reinforcing layers with different coating widths. The radial tire was tested for the operation stability and the drum durability. The results are shown in Table 1.

TABLE 1

|  | Examples | | | | |
| --- | --- | --- | --- | --- | --- |
|  | 1 | 2 | 3 | 4 | 5 |
| Non-woven fabric |  |  |  |  |  |
| Kind of fiber*1 | *1 | *1 | *1 | *1 | *1 |
| Fiber length (mm) | 50 | 50 | 50 | 30 | 100 |
| Single fiber diameter (μm) | 20 | 20 | 20 | 12 | 30 |

TABLE 1-continued

| | | | | | |
|---|---|---|---|---|---|
| Fiber tensile modulus (GPa) | 74 | 74 | 74 | 74 | 74 |
| Basis weight (g/cm²) | 50 | 50 | 50 | 40 | 80 |
| Thickness D1 under a load of 10 gf/cm² (mm) | 2.1 | 2.1 | 2.1 | 1.4 | 3.1 |
| Thickness D2 under a load of 200 gf/cm² (mm) | 0.55 | 0.55 | 0.55 | 0.49 | 0.88 |
| D1/D2 | 3.8 | 3.8 | 3.8 | 2.8 | 3.5 |
| Tire | | | | | |
| Coating width (mm) | 30 | 60 | 80 | 30 | 30 |
| Operation stability (index) | 110 | 125 | 191 | 104 | 141 |
| Drum durability (index) | 124 | 154 | 206 | 106 | 172 |

| | Comparative Examples | | | Control Examples | |
|---|---|---|---|---|---|
| | 1 | 2 | 3 | 1* | 2* |
| Non-woven fabric | | | | | |
| Kind of fiber | *1 | 6,6-nylon | 6,6-nylon | *2 | *2 |
| Fiber length (mm) | 50 | 50 | 50 | — | — |
| Single fiber diameter (μm) | 20 | 20 | 20 | — | — |
| Fiber tensile modulus (GPa) | 74 | 2.6 | 2.6 | 7.4 | 7.4 |
| Basis weight (g/cm²) | 50 | 50 | 240 | — | — |
| Thickness D1 under a load of 10 gf/cm² (mm) | 0.96 | 2.8 | 11.6 | — | — |
| Thickness D2 under a load of 200 gf/cm² (mm) | 0.55 | 0.54 | 2.6 | — | — |
| D1/D2 | 1.7 | 5.1 | 4.4 | — | — |
| Tire | | | | | |
| Coating width (mm) | 30 | 30 | 30 | 60 | 80 |
| Operation stability (index) | 98 | 80 | 83 | 100 | 124 |
| Drum durability (index) | 96 | 76 | 54 | 100 | 62 |

*Cord fabric was used instead of non-woven fabric.
*¹Technora: trademark, Copoly-p-phenylene-3,4'-oxydiphenylene terephthalamide manufactured by Teijin Limited
*² Polyethylene terephthalate: "Tetoron" (trademark) manufactured by Teijin Limited

EXAMPLES 6-10

A tire for trucks and buses (315/60R22.5) was mounted to a rim to produce a tire/rim assembly having a reinforcing layer 7 for tube as shown in FIG. 1. The reinforcing layer 7 was prepared by laminating 4 layers of a rubber-fiber composite material each obtained by rubber-coating a non-woven fabric having a basis weight of 50 g/m² and being made of fibers whose kind and single fiber diameter are shown in Table 2. The tire/rim assembly was evaluated for the normal running durability and the run-flat durability under a tire inner pressure of 900 kPa and a tube inner pressure of 950 or 1,000 kPa. The results are shown in Table 2

COMPARATIVE EXAMPLE 4

A tire/rim assembly was produced and then evaluated in the same manner as in Example 6 except that no reinforcing layer was provided. The results are shown in Table 2.

COMPARATIVE EXAMPLES 5-7

The tire/rim assembly was produced and then evaluated in the same manner as in Example 6 except that the non-woven fabric shown in Table 2 was used and the reinforcing layer was made into 4- or 8-layer structure of the rubber-fiber composite material. The results are shown in Table 2.

TABLE 2

| | Examples | | | | |
|---|---|---|---|---|---|
| | 6 | 7 | 8 | 9 | 10 |
| Reinforcing layer Non-woven fabric | | | | | |
| Kind of fiber | *1 | *1 | *1 | *3 | *1 |
| Single fiber diameter (μm) | 20 | 10 | 35 | 12 | 20 |
| Fiber tensile modulus (GPa) | 70 | 70 | 70 | 68 | 70 |
| Number of laminated layers | 4 | 4 | 4 | 4 | 4 |
| Tube weight (index)*⁵ | 120 | 120 | 120 | 120 | 120 |
| Inner pressure | | | | | |
| Tire (kPa) | 900 | 900 | 900 | 900 | 900 |
| Tube (kPa) | 950 | 950 | 950 | 950 | 1000 |
| Performance | | | | | |
| Normal running durability (index) | 196 | 178 | 159 | 169 | 174 |
| Run-flat durability (index) | 166 | 131 | 159 | 137 | 206 |

| | Comparative Examples | | | |
|---|---|---|---|---|
| | 4 | 5 | 6 | 7 |
| Reinforcing layer Non-woven fabric | | | | |
| Kind of fiber | — | PET*² | PET*² | Nylon*⁴ |
| Single fiber diameter (μm) | — | 25 | 25 | 25 |
| Fiber tensile modulus (GPa) | — | 18 | 18 | 4 |
| Number of laminated layers | None | 4 | 8 | 4 |
| Tube weight (index)*⁵ | 100 | 120 | 140 | 120 |
| Inner pressure | | | | |
| Tire (kPa) | 900 | 900 | 900 | 900 |
| Tube (kPa) | 950 | 950 | 950 | 950 |
| Performance | | | | |
| Normal running durability (index) | 100 | 103 | 109 | 107 |
| Run-flat durability (index) | 100 | 126 | 78 | 122 |

*1 Technora: trademark, Copoly-p-phenylene-3,4'-oxydiphenylene terephthalamide manufactured by Teijin Limited
*²Polyethylene terephthalate: "Tetoron" (trademark) manufactured by Teijin Limited
*3 Kevlar: trademark, manufactured by Du Pont Corp.
*⁴Nylon: "Leona" (trademark) manufactured by Asahi Kasei Corporation
*⁵Tube weight (index): Total weight of tube 5 and reinforcing layer 7 expressed by index number taking the tube weight of Control Example 4 as 100.

As seen from the above results, the tires of Examples 6 to 10 according to the present invention were remarkably excellent in both the normal running durability and the run-flat durability, whereas the tires of Comparative Examples 5 to 7 were only slightly improved or rather deteriorated as compared to the tire of Comparative Example 4 (no reinforcing layer).

INDUSTRIAL APPLICABILITY

By using the rubber-fiber composite material of the present invention as a reinforcing material for rubber articles, the durability of the rubber articles can be enhanced together with the reduction of their weight. By using the rubber-fiber composite material as a reinforcing member for sidewalls of tire, the operation stability and the drum durability, in particular, are remarkably improved.

In the safety pneumatic tire of the present invention, since a tube is reinforced with the rubber-fiber composite material of the present invention, the inner pressure of the tube can be set higher than that of the tire. This increases the air volume of expanded tube when the tire is punctured, thereby preventing the deflection during run-flat running to greatly improve the run-flat durability. In addition, an excessive increase of the weight of the safety pneumatic tire can be avoided to improve the normal running performance such as low fuel consumption.

What is claimed is:

1. A safety pneumatic tire comprising a tire assembly having:
   (A) a tubeless tire comprising an annular tread having a pair of sidewalls respectively extending radially inwardly from opposite ends of the tread, and beads each embedded in a radially inner end of the sidewall;
   (B) a tube disposed within the tubeless tire; and
   (C) a reinforcing layer covering at least a top portion of the tube,
   wherein a space is formed between an outer surface of the tube and an inner surface of a crown portion of the tubeless tire in inflated conditions;
   wherein the reinforcing layer is disposed so as to extend radially outwardly to come into close contact with an inner surface of the tread of the tubeless tire when an inner pressure of the tire decreases, thereby enabling run-flat running;
   wherein the reinforcing layer is made of a rubber-fiber composite material comprising a non-woven fabric and a rubber, at least a part of the non-woven fabric being made of an organic fiber having a single fiber diameter of 10 to 35 μm and a tensile modulus of 50 GPa or higher, and the non-woven fabric has a ratio D1/D2 of 2 or more, wherein D1 is a thickness of the non-woven fabric when measured under a pressure of 10 gf/cm² (about 981 Pa), and D2 is a thickness of the non-woven fabric when measured under a pressure of 200 gf/cm² (about 19,613 Pa).

2. The safety pneumatic tire according to claim 1, wherein the organic fiber has a fiber length of 30 to 100 mm.

3. The safety pneumatic tire according to claim 1, wherein the organic fiber is para-aramid fiber.

4. The safety pneumatic tire according to claim 3, wherein the para-aramid fiber is contained in an amount of 50% by weight or more based on the total weight of the organic fiber constituting the non-woven fabric.

5. The safety pneumatic tire according to claim 3, wherein the para-aramid fiber is copoly-p-phenylene-3,4'-oxydiphenylene terephthalamide or poly-p-phenylene terephthalamide.

6. The safety pneumatic tire according to claim 1, wherein the non-woven fabric has a basis weight of 30 to 120 g/m².

7. The safety pneumatic tire according to claim 1, wherein the non-woven fabric has a thickness of 0.2 to 1.4 mm when measured under a pressure of 20 gf/cm² (about 1,961 Pa).

8. The safety pneumatic tire according to claim 1, wherein the reinforcing layer is made of a laminate having 3 to 6 layers of the rubber-fiber composite material.

9. The safety pneumatic tire according to claim 1, wherein an inner pressure of the tube is kept 20 to 100 kPa higher than that of the tire.

10. The safety pneumatic tire according to claim 1, wherein the content of the organic fiber having a tensile modulus of 50 GPa or higher is 50% or higher by weight of the non-woven fabric.

11. The safety pneumatic tire according to claim 1, wherein the content of the organic fiber having a tensile modulus of 50 GPa or higher is 100% by weight of the non-woven fabric.

* * * * *